US008332151B2

(12) United States Patent
Suganuma et al.

(10) Patent No.: US 8,332,151 B2
(45) Date of Patent: Dec. 11, 2012

(54) GRADIENT INFORMATION CALCULATING SYSTEM, VEHICLE RUNNING CONTROL SYSTEM, NAVIGATION SYSTEM, AND GRADIENT INFORMATION CALCULATING METHOD

(75) Inventors: Hideaki Suganuma, Yokohama (JP); Mamoru Kuraishi, Ome (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 349 days.

(21) Appl. No.: 12/918,332

(22) PCT Filed: Mar. 26, 2009

(86) PCT No.: PCT/IB2009/005078
§ 371 (c)(1),
(2), (4) Date: Aug. 19, 2010

(87) PCT Pub. No.: WO2009/118624
PCT Pub. Date: Oct. 1, 2009

(65) Prior Publication Data
US 2010/0324752 A1 Dec. 23, 2010

(30) Foreign Application Priority Data
Mar. 27, 2008 (JP) .................................. 2008-083795

(51) Int. Cl.
*G01V 3/38* (2006.01)
*G01C 17/38* (2006.01)
(52) U.S. Cl. ................. 702/5; 702/92; 702/94; 702/102
(58) Field of Classification Search ...... 702/5, 121–123, 702/182–189, 150–155; 701/409
See application file for complete search history.

(56) References Cited

U.S. PATENT DOCUMENTS
2006/0139619 A1* 6/2006 Fujii et al. .................... 356/4.03
2007/0010933 A1* 1/2007 Hochkirchen et al. ........ 701/117

FOREIGN PATENT DOCUMENTS
EP 0 534 892 A1 3/1993
EP 1 777 135 A1 4/2007
(Continued)

OTHER PUBLICATIONS
International Search Report for corresponding International Patent Application No. PCT/IB2009/005078 mailed Jun. 26, 2009.

(Continued)

*Primary Examiner* — Phuong Huynh
(74) *Attorney, Agent, or Firm* — Sughrue Mion, PLLC (57) ABSTRACT

A gradient information calculating system includes a first calculating unit (14) that detects three-dimensional location information through autonomous navigation, and calculates a first gradient value ($\theta b$, B), based on a distance (m) traveled, and an on-plane distance (L1) obtained by projecting the distance (m) traveled on a horizontal plane, a road map information storing unit (17) that stores road map information that represents each road by nodes of which the location information is known, and a link that connects the nodes, a second calculating unit (16) that estimates elevations of the nodes from previously measured elevation data, and calculates a second gradient value (A), based on a difference in elevation between the nodes and the length of the link, and a gradient data selecting unit (19) that selects one of the first and second gradient values to be adopted as a gradient value of the link, according to a difference between the first and the second gradient values.

16 Claims, 9 Drawing Sheets

FOREIGN PATENT DOCUMENTS

| | | |
|---|---|---|
| JP | 08-304069 A | 11/1996 |
| JP | 2004-252152 A | 9/2004 |
| JP | 2005-077299 A | 3/2005 |
| JP | 3656469 B2 | 3/2005 |
| JP | 2005-195476 A | 7/2005 |
| JP | 3966097 B2 | 6/2007 |
| JP | 3985622 B2 | 7/2007 |
| JP | 2007-248165 A | 9/2007 |
| JP | 2007-285712 A | 11/2007 |

OTHER PUBLICATIONS

Written Opinion for corresponding International Patent Application No. PCT/IB2009/005078 mailed Jun. 26, 2009.

JP Office Action for corresponding Japanese Patent Application No. 2008-083795 dated Mar. 29, 2010.

* cited by examiner

$$m = \sum_{X1}^{X2} V1 \times t$$

$$L1 = \sqrt{(X2-X1)^2 + (Y2-Y1)^2}$$

$$\cos\theta b = \frac{L1}{m}$$

FIG. 4

LINK NUMBER : LINK 001

| STARTING-POINT NODE | NODE 001 |
|---|---|
| ENDPOINT NODE | NODE 002 |
| LINK LENGTH | 15 [m] |
| WIDTH | 5 [m] |
| AZIMUTH ANGLE | 90 DEGREES |
| GRADIENT VALUE $\theta b$ OF LOCATION (X, Y) | |
| (X1,Y1) | $\theta b1$ |
| (X2,Y2) | $\theta b2$ |
| (X3,Y3) | $\theta b3$ |
| (X4,Y4) | $\theta b4$ |
| (X5,Y5) | $\theta b5$ |
| (X6,Y6) | $\theta b6$ |

| CATEGORY | | | | |
|---|---|---|---|---|
| TYPE 1, TYPE 2, AND TYPE 3 | ORDINARY ROAD | 120 | 2 | 5 |
| | | 100 | 3 | 6 |
| | | 80 | 4 | 7 |
| | | 60 | 5 | 8 |
| | | 50 | 6 | 9 |
| | | 40 | 7 | 10 |
| | | 30 | 8 | 11 |
| | | 20 | 9 | 12 |
| | SMALL-SIZE ROAD | 120 | 4 | 5 |
| | | 100 | 7 | 6 |
| | | 80 | 8 | |
| | | 60 | 9 | |
| | | 50 | 10 | |
| | | 40 | 11 | |
| | | 30 | 12 | |
| | | 20 | | |
| TYPE 4 | ORDINARY ROAD | 60 | 5 | 7 |
| | | 50 | 6 | 8 |
| | | 40 | 7 | 9 |
| | | 30 | 8 | 10 |
| | | 20 | 9 | 11 |
| | SMALL-SIZE ROAD | 60 | 8 | |
| | | 50 | 9 | |
| | | 40 | 10 | |
| | | 30 | 11 | |
| | | 20 | 12 | |

FIG. 7B

| | LOCAL AREA | URBAN AREA |
|---|---|---|
| NATIONAL HIGHWAY AND MOTORWAY | TYPE 1 | TYPE 2 |
| OTHER ROADS | TYPE 3 | TYPE 4 |

FIG. 9B

GRADIENT INFORMATION CALCULATING SYSTEM, VEHICLE RUNNING CONTROL SYSTEM, NAVIGATION SYSTEM, AND GRADIENT INFORMATION CALCULATING METHOD

BACKGROUND OF THE INVENTION

1. Field of the Invention

The invention relates to a gradient information calculating system capable of acquiring road gradient information, a vehicle running control system, a navigation system, and a gradient information calculating method.

2. Description of the Related Art

Vehicles, such as hybrid vehicles, which can generate electric power through regenerative braking, or the like, are able to run with high efficiency by performing driving control according to the gradients of roads. For example, the engine power is reduced and electric power is generated on downward slopes, whereas the vehicle is driven basically with the engine, with the aid of an electric motor, on upward slopes. On the basis of this concept, it is known to control the vehicle according to an energy consumption advance plan, in which the amount of energy consumed is planned in advance, based on gradient information associated with each road, so as to further improve the fuel economy.

However, a map DB (data base) stored in a navigation system contains gradient information for only a part of the roads, such as access roads to highways, and the thus limited gradient information is not sufficient for making of the energy consumption advance plan. If it is planned to acquire gradient information of all of the links (roads) through measurements, or the like, and store them in the map DB, the cost is expected to be enormous, which makes the plan impractical.

In the meantime, the navigation system calculates vehicle location information, utilizing the GPS (Global Positioning System). The GPS enables the navigation system to detect the three-dimensional location of the vehicle, and thus enables the system to detect the elevation of the vehicle. However, the accuracy of commercially available GPS radio waves is intentionally reduced, and therefore, the GPS radio waves are not suitable for detecting the elevation. Also, it is required to capture four or more GPS satellites in principle for detecting the elevation; therefore detection of the elevation is less likely to be accomplished while the vehicle is running in urban areas.

In view of the above background, there has been proposed a technology of calculating gradient information of links by using grid elevation data with a grid spacing of 50 m (meter), which is released by the Geographical Survey Institute of Japan (see, for example, Japanese Patent No. 3985622). However, it is difficult to use the grid elevation data as they are for all roads, since the grid elevation data indicate an elevation of each of sections (meshes) into which a map is divided by latitudes and longitudes in a grid pattern, regardless of the presence or absence of a road in each section. Japanese Patent No. 3985622 discloses a navigation system that estimates gradients of roads, with reference to locations (specific point data), such as bridges or tunnels, where data of elevations, gradients, etc. of the actual roads are known, and grid elevation data.

However, the navigation system of Japanese Patent No. 3985622, which uses the specific point data stored in map data and the grid elevation data, assures the accuracy of elevations only at around the specific point data, and there is a limit to the roads for which the gradients can be accurately estimated. Namely, it is difficult to acquire accurate gradient information for roads that are spaced apart from the specific point data.

SUMMARY OF THE INVENTION

The invention provides a gradient information calculating system capable of acquiring gradient values of roads at a high density, a vehicle running control system, a navigation system, and a gradient information calculating method.

A first aspect of the invention relates to a gradient information calculating system. The gradient information calculating system includes a first calculating unit that detects three-dimensional location information through autonomous navigation, and calculates a first gradient value (e.g., gradient data B) of a given point on a road, based on a distance traveled in a given period of time, and an on-plane distance obtained by projecting the distance traveled on a horizontal plane, a road map information storing unit that stores road map information that represents each road by a first node and a second node of which the location information is known, and a link that connects the first node with the second node, a second calculating unit that estimates an elevation of each of the nodes from previously measured elevation data, and calculates a second gradient value for the link, based on a difference in elevation between the first node and the second node, and the length of the link, and a gradient data selecting unit that compares the first gradient value with the second gradient value, and selects one of the first and second gradient values to be adopted as a gradient value of the given point or link, according to a difference between the first gradient value and the second gradient value.

According to the first aspect of the invention, the gradient information calculating system corrects the first gradient values actually measured through autonomous navigation, using the second gradient values obtained from previously measured elevation data, so as to acquire gradient values at a high density while assuring the accuracy thereof.

In the first aspect of the invention, the gradient data selecting unit may select the second gradient value when the difference between the first gradient value and the second gradient value is large, or may select the second gradient value when the first gradient value is larger by a predetermined value or more than the second gradient value. In this case, the predetermined value may be 50% of the second gradient value.

In the first aspect of the invention, the second calculating unit may select the elevation data within a given distance from the node in question, from the elevation data measured for each of meshes defined by latitudes and longitudes arranged with a specified grid spacing, and may weigh the elevation data within the given distance, according to a distance between a measurement position of the elevation data and the node, so as to estimate the average of the weighed elevation data as an elevation of the node. Also, in the first aspect of the invention, the second calculating unit may select the elevation data of a mesh to which the node in question belongs, and the elevation data of eight meshes surrounding the mesh, from the elevation data measured for each of meshes defined by latitudes and longitudes arranged with a specified grid spacing, and may weigh the elevation data of the mesh and the surrounding eight meshes, according to a distance between a measurement position of the elevation data and the node, so as to estimate the average of the weighed elevation data as an elevation of the node.

In the first aspect of the invention, when the road map information includes a link comprising an artificial structure whose elevation data is registered, the second calculating unit may adopt a gradient value calculated from elevation data of end points of the artificial structure and the length of the link, as the second gradient value.

The gradient information calculating system according to the first aspect of the invention may further include a guideline information storing unit that stores guideline information that specifies a gradient upper limit of gradients for each road category, and a gradient upper-limit determining unit that reads the gradient upper limit based on the road category, and adopts the gradient upper limit as a gradient value for the given point or link, when the second gradient value obtained by calculation is larger than the gradient upper limit. Also, the gradient information calculating system according to the first aspect of the invention may further include a guideline information storing unit that stores guideline information that specifies a gradient upper limit of gradients for each road category, and a gradient upper-limit determining unit that reads the gradient upper limit based on the road category, and adopts the gradient upper limit as the second gradient value when the second gradient value obtained by calculation is larger than the gradient upper limit.

The gradient information calculating system according to the first aspect of the invention may further include a transmitter that transmits the first gradient value calculated by the first calculating unit, to a server, and a receiver that receives the first gradient value calculated by another vehicle, from the server.

A vehicle running control system according to a second aspect of the invention includes the gradient information calculating system as described above, and a vehicle controller that performs vehicle control, using the gradient value selected by the gradient data selecting unit.

A navigation system according to a third aspect of the invention includes the gradient information calculating system as described above, a UPS receiver, and a display unit that displays a road map including a location detected through autonomous navigation.

A gradient information calculating method according to a fourth aspect of the invention includes the steps of: detecting three-dimensional location information through autonomous navigation, calculating a first gradient value of a given point on a road, based on a distance traveled in a given period of time, and an on-plane distance obtained by projecting the distance traveled on a horizontal plane, estimating elevations of a first node and a second node on the road, from previously measured elevation data, calculating a second gradient value for a link that connects the first node with the second node, based on a difference in elevation between the first node and the second node, and the length of the link, comparing the first gradient value with the second gradient value and calculating a difference between the first gradient value and the second gradient value, and selecting one of the first and second gradient values to be adopted as a gradient value of the given point or link, according to the calculated difference.

In the fourth aspect of the invention, when the link is an artificial structure whose elevation data is registered, a gradient value calculated from elevation data of end points of the artificial structure and the length of the link may be adopted as the second gradient value.

The gradient information calculating method according to the fourth aspect of the invention may further include the steps of: storing guideline information that specifies a gradient upper limit of gradients for each road category, reading the gradient upper limit based on the road category, and adopting the gradient upper limit as a gradient value for the given point or link when the second gradient value obtained by calculation is larger than the gradient upper limit. The gradient information calculating method according to the fourth aspect of the invention may further include the steps of transmitting the calculated first gradient value to a server, and receiving the first gradient value calculated by another vehicle, from the server.

According to the above-indicated aspects of the invention, the gradient information calculating system, vehicle running control system, navigation system, and the gradient information calculating method that can acquire gradient values of road at a high density, can be provided.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
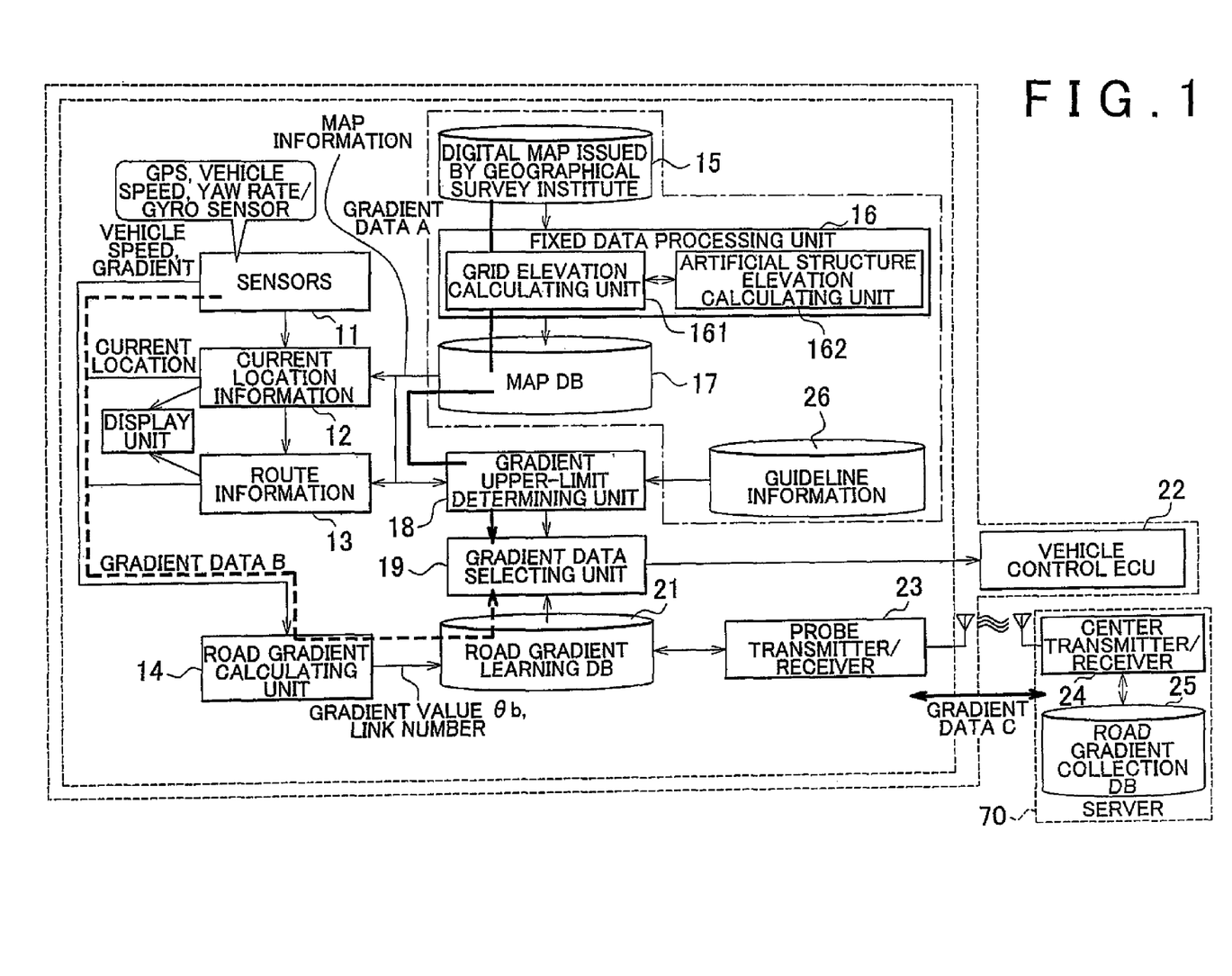
FIG. 1 is a block diagram showing a vehicle running control system including a navigation system according to one embodiment of the invention.

An exemplary embodiment of the invention will be described with reference to the drawings. FIG. 1 is a block diagram of a vehicle running control system 60 including a navigation system 50 according to this embodiment of the invention. The navigation system 50 acquires gradient values from three types of gradient data (gradient data A-C).

Gradient data A as second gradient values are fixed gradient values that are selected from the following three types of gradient values (A1-A3). Namely, the gradient data A consists of fixed values based on generally available values. While the values of the gradient data A may be reliable ones, the gradient data A is not necessarily available to every road. A1) Gradient values calculated from grid elevation data released by the Geographical Survey Institute of Japan.

A2) Gradient values calculated by using artificial structures whose elevations are known.
A3) Gradient values of road gradient guidelines stipulated by statute.

On the other hand, gradient data B as first gradient values are gradient values calculated from information detected during actual running on roads. Gradient data C as first gradient values are gradient values originating from the gradient data B that values are transmitted from each vehicle serving as a probe car to a server 70 and are accumulated in the server 70, which are transmitted from the server 70 to, for example, a vehicle that has not traveled on the road in question. Thus, the gradient data B and the gradient data C are calculated by the same method.

While the navigation system 50 of this embodiment obtains the gradient data A-C in the manners as described above, the vehicle running control system 60, when controlling the vehicle, compares the gradient data B or gradient data C, with the gradient data A, and makes an energy consumption advance plan, based on a more reliable one of the gradient data B or C and the gradient data A. Since the gradient data B or C are calculated values, errors contained in measurement values of sensors 11 due to vibrations of vehicles, etc. may be accumulated in the gradient data B or C, and the gradient data B or C may be different from the actual gradients. On the other hand, the gradient values A are highly reliable, fixed values. Accordingly, the gradient data B or C are deemed to be highly reliable when they are not greatly larger than the gradient data A. For example, the gradient data B or C may be limited to gradient values equal to or smaller than those of the gradient data A, to assure sufficiently high reliability, or the gradient data B or C may be determined as being extremely large (having low reliability) when the gradient data B or C are larger by 50% or more than the gradient data A.

Thus, the navigation system 50 of this embodiment calculates gradient values from actual measurement data of the vehicle so as to acquire actually measured gradient data B at a high density, and corrects the gradient data B using the fixed gradient data A, depending on the reliability of the gradient data B, thus assuring sufficiently high reliability of the resultant gradient values. In the following description, values that constitute the gradient data A-C will be called "gradient values", but gradient data A-C and gradient values, which overlap each other, need not be strictly distinguished from each other.

Navigation System 50

The above-mentioned sensors 11 include, for example, a GPS (Global Positioning System) receiver, a vehicle speed sensor, a yaw rate sensor, a gyro sensor, and so forth, and are used for detecting current vehicle location information 12 and route information 13. The navigation system 50 calculates current vehicle location information 12 based on measurement values of the above-indicated sensors, by a method which will be described later. The system 50 is able to detect route information 13 from a history of past current location information 12 and the latest current location information 12, so as to predict a road on which the vehicle is going to run, from the route information 13. In the case where a destination is set or entered, route information 13 regarding a route to the destination is registered in the navigation system 50. If the route information 13 is known, the navigation system 50 is able to make an energy consumption advance plan based on the gradient value of each road.

The navigation system 50 has a display unit on which a road map including the current location information 12 or the route information 13 is displayed. In operation, the navigation system 50 reads road map information stored in a map DB 17 in accordance with the current location information 12, and displays the information, along with an icon indicating the vehicle, on the display unit.

Gradient Data B

Calculation of gradient data B will be explained. The navigation system 50 is a computer in which CPU, RAM, ROM, non-volatile memory, communicating unit for communications among ECU, and input and output interfaces are connected via internal buses. The CPU executes a certain program so as to realize a road gradient learning unit 14. The road gradient learning unit 14 calculates gradients of roads on which the vehicle has traveled, and stores gradient data B in correspondence with links of the map DB 17. The map DB 17 is provided by HDD (Hard Disk Drive) or nonvolatile memory, such as a flash memory, and stores road map information in relation to location information, such as latitudes and longitudes.

Figure 2:
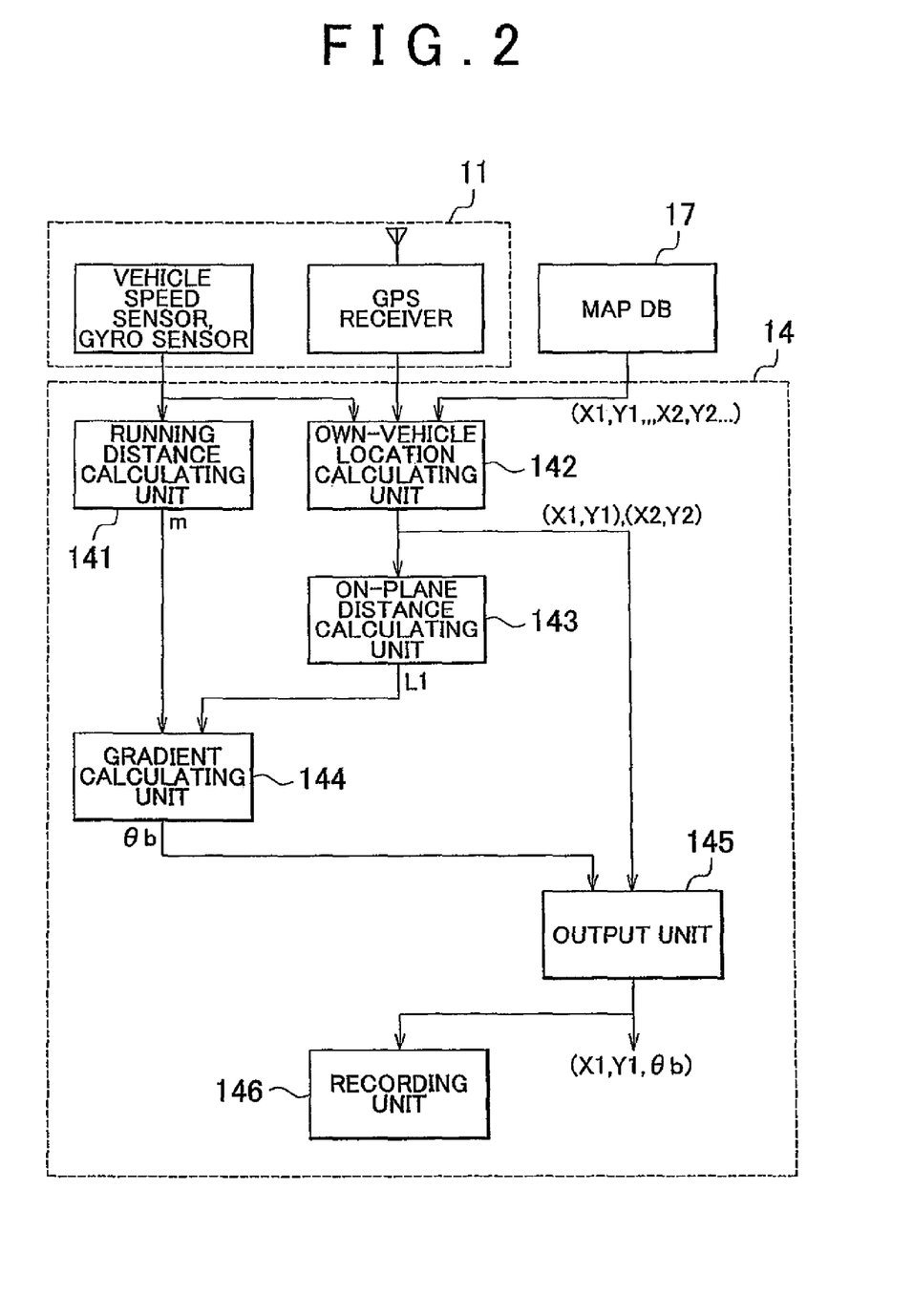
FIG. 2 is a functional block diagram of a road gradient learning unit according to the embodiment of the invention.

FIG. 2 is a functional block diagram of the road gradient learning unit 14. In FIG. 2, the same reference numerals as used in FIG. 1 are used for identifying the same components or units as those of FIG. 1. The GPS receiver detects vehicle location information, based on lengths of time it takes for radio waves transmitted from a plurality of GPS satellites to reach the receiver. The vehicle speed sensor detects changes in magnetic flux when projections mounted with a constant spacing on a circumference of a rotor provided at each wheel of the own vehicle pass the sensor, and generates a pulse each time the vehicle runs a given distance.

The yaw rate sensor or gyro sensor is, for example, a vibrating reed type gyro sensor formed by micro-machining. This type of gyro sensor outputs the Coriolis force produced according to the turning speed of the own vehicle, as a voltage signal representing a change between electrodes. Since the turning angle is obtained by integrating the turning speed with respect to time, the information regarding the traveling or running direction of the vehicle can be obtained by integrating the output of the yaw rate sensor or gyro sensor with respect to time. The vehicle traveling direction is divided into a horizontal direction and an elevation-angle direction, and the yaw rate sensor or gyro sensor, which detects turning speeds about two or three axes, is able to detect traveling directions in terms of the azimuth (horizontal direction) and elevation angle (direction of pitching angle). In this embodiment, the gradient data B is calculated using, in particular, the elevation angle.

The road map information stored in the road map DB 17 is a data base in the form of a table that correlates link information indicative of links that constitute roads, with node information indicative of nodes (intersections or points located at certain intervals on links) that connect adjacent ones of the links. The link information includes the length and width of each link, nodes, directions in which the links are connected at the nodes, etc.; therefore, the actual road network is reproduced from the road map information. Also, in the road DB 17, a road attribute or attributes, such as a tunnel in a mountainous area, a bridge, or a railroad crossing, and the type of the road, such as a highway or expressway, or an ordinary road, are registered for each link. In this embodiment, gradient values (gradient data B) are calculated and stored at intervals of, for example, one meter to several meters, on the links.

A running distance calculating unit 141 calculates the running distance m of the vehicle by integrating the vehicle speed detected by the vehicle speed sensor with respect to time, or accumulating pulses detected by the vehicle speed sensor. An own-vehicle location calculating unit 142 calculates the current location information 12, by starting with the location information detected by the GPS receiver, and accumulating the running distance m calculated by the running distance calculating unit 141 on the detected location information, along the traveling direction detected by the gyro sensor, or the like. Also, the own-vehicle location calculating unit 142 determines the location of the vehicle, through map matching for mapping the location of the vehicle on a location (link) in the map DB 17 on which the vehicle is highly likely to be located, based on the current location information 12 or the route information 13.

The own-vehicle position calculating unit 142 calculates the current location information 12 on three-dimensional space, from the azimuth and the elevation angle, each time a specified cycle time (e.g., 100 milliseconds to several seconds) elapses, so as to acquire coordinate information (X, Y, Z) of the vehicle with respect to a certain reference position. The gradient values are calculated from the coordinate information.

Figure 3:
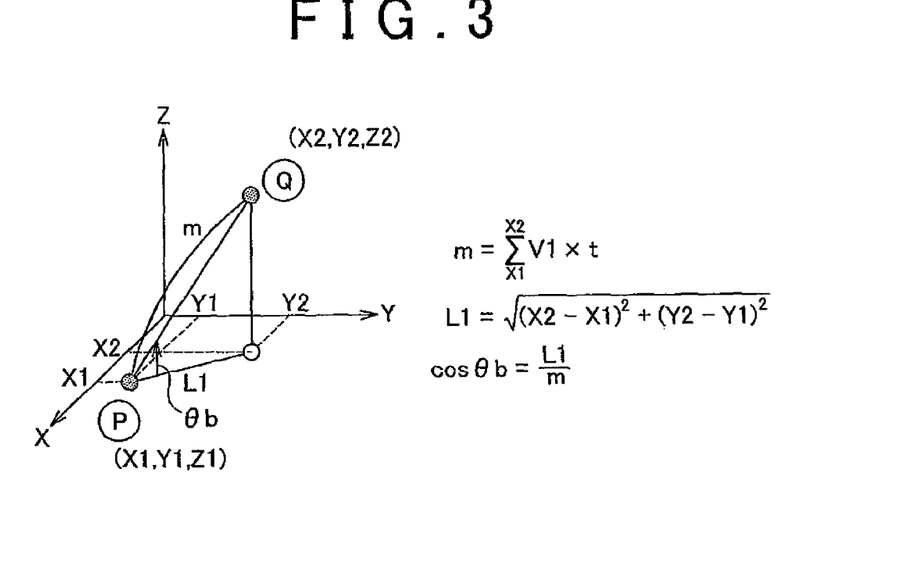
FIG. 3 is a view schematically illustrating calculation of a gradient value according to the embodiment of the invention.

FIG. 3 schematically illustrates calculation of gradient values. Assuming that the vehicle has moved from point P (X1, Y1, Z1) to point Q (X2, Y2, Z2) within the cycle time, the running distance (distance traveled) m at this time is calculated by the running distance calculating unit 141. In this case, a gradient value $\theta b$ is an angle formed by the XY plane (horizontal plane) and segment PQ. Accordingly, the gradient value $\theta b$ is calculated from on-plane distance L1 obtained by projecting segment PQ on the XY plane, and the running distance m.

Initially, an on-plane distance calculating unit 143 calculates the on-plane distance L1 according to the following expression.

On-plane Distance $L1=\sqrt{\{(X2-X1)^2+(Y2-Y1)^2\}}$ (1)

Then, a gradient calculating unit 144 calculates the gradient value $\theta b$ according to the following expression.

Gradient Value $\theta b = \arccos(L1/m)$ (2)

If the cycle time is a sufficiently short length of time, a difference between the length of segment PQ and the running distance m may be ignored. In this embodiment, the running distance m is preferably a short distance of about 1 meter, so that the running distance m can be approximated to segment PQ.

An output unit 145 correlates the gradient value $\theta b$ with the coordinate information (X1, Y1) calculated by the own-vehicle location calculating unit 142, and generates the result to a recording unit 146. The recording unit 146 stores the coordinate value $\theta b$ for every one meter on a link specified by the coordinate information (X1, Y1). As a result, gradient values $\theta b$ are stored at a high density in the road gradient learning DB 21. The gradient values $\theta b$ may be directly stored into the map DB 17.

Figure 4:
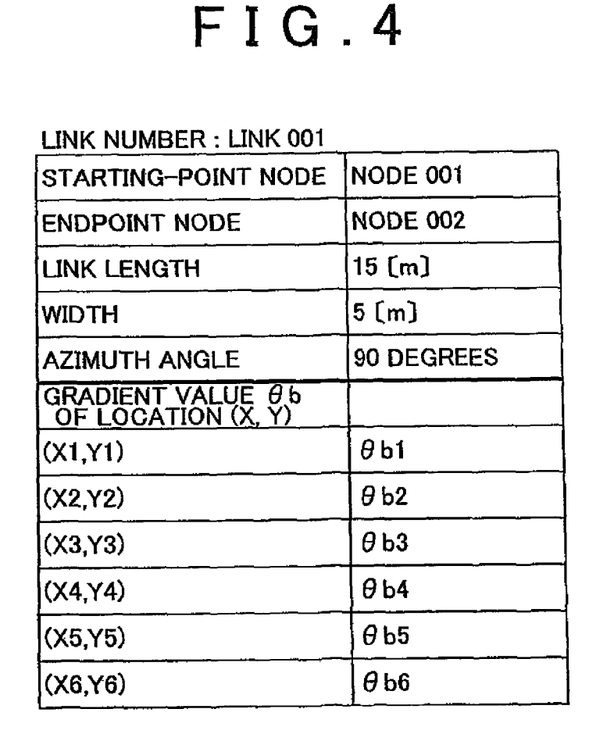
FIG. 4 is a view showing an example of gradient values θb stored in a road gradient learning DB according to the embodiment of the invention.

FIG. 4 shows an example of gradient values $\theta b$ stored in the road gradient learning DB 21. In FIG. 4, (X1, Y1) through (X6, Y6) indicate given positions on link 001. If the absolute values of elevations of the given positions are known, the elevations of (X1, Y1) through (X6, Y6) can be obtained; therefore, elevation data may be stored along with the gradient values $\theta b$. The absolute values of the elevations of the given positions may be obtained from, for example, the GPS receiver, or may be obtained through accumulation of $\theta b$.

Gradient Data A

The gradient data A will be explained. The gradient data A are selectively determined from the following three types of gradient values $\theta a1$-$\theta a3$. A gradient upper-limit determining unit 18 of FIG. 1 adopts the most appropriate gradient value selected from the three gradient values $\theta a1$-$\theta a3$, as gradient data A.

Figure 5:
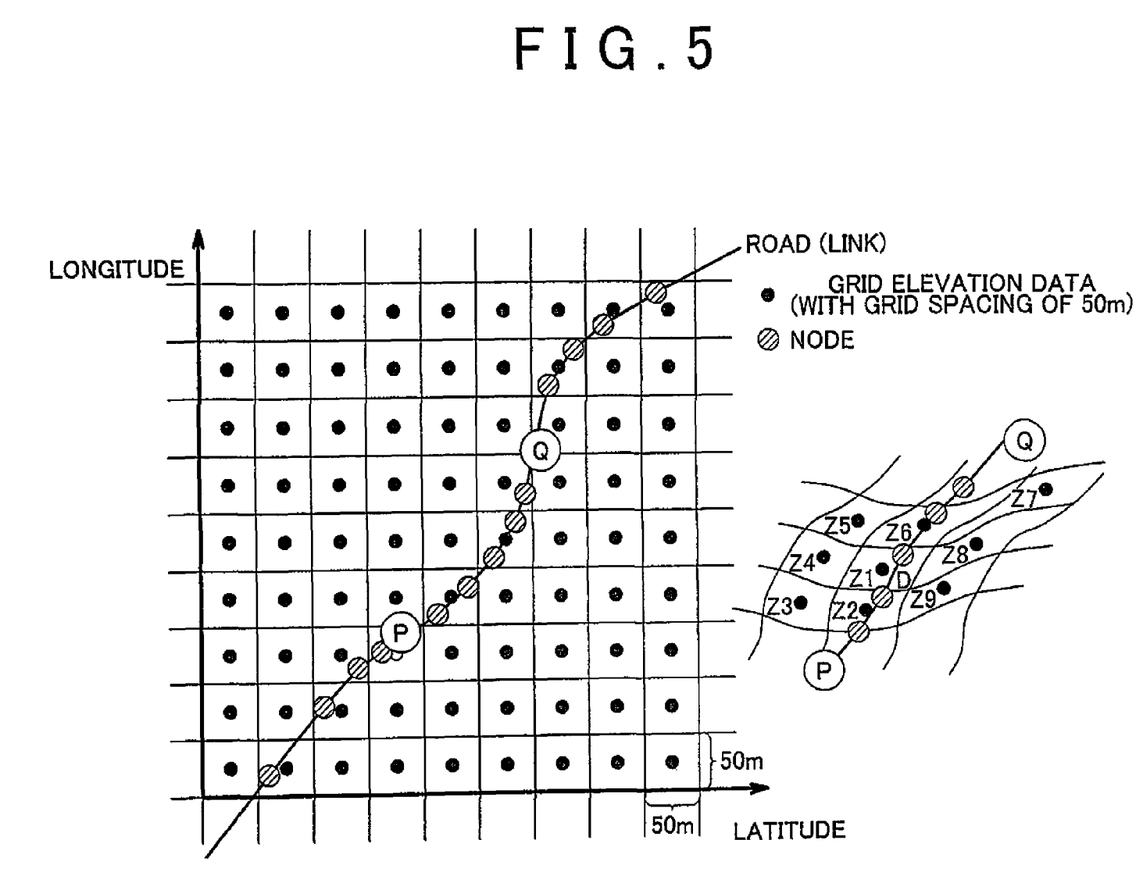
FIG. 5 is a view schematically illustrating the manner of calculating a gradient value from grid elevation data according to the embodiment of the invention.

A1) Gradients Calculated from the Grid Elevation Data Released by the Geographical Survey Institute FIG. 5 is a view schematically illustrating the manner of calculating a gradient value $\theta a1$ based on the grid elevation data. As shown in FIG. 5, a map is divided by parallels of longitude and parallels of latitude into a grid pattern consisting of 50-meter squares or meshes, and grid elevation data indicating elevations of respective meshes into which the map is divided in the grid pattern is stored in a digital map 15 of FIG. 1 issued by the Geographical Survey Institute. Accordingly, the grid elevation data may be rough data as compared with the gradient data B, but the roughness has a little influence on calculation of gradient information since the gradient data A is used as complementary data in place of the gradient data B. The digital map 15 issued by the Geographical Survey Institute may be stored in advance in the vehicle, or may be downloaded from the server 70 and used.

A grid elevation calculating unit 161 of FIG. 1 sequentially detects a node D (which will be called "node of interest") that is closest to the current location information 12, referring to the map DB 17, based on the current location information 12. There are some meshes surrounding the node of interest D, and grid elevation data for each mesh has been measured. In FIG. 5, grid elevation data of meshes surrounding the node of interest D are denoted by Z1 to Z9.

The grid elevation calculating unit 161 performs averaging processing on the grid elevation data Z1 to Z9 of the surrounding meshes, in accordance with the distance between each mesh and the node of interest D, so as to calculate an estimated elevation K1 of the node of interest D. The estimated elevation K1 may be calculated according to, for example, the following expression.

$$K1 = \sum_{i=1}^{N} \frac{(Zi \times Li)}{\frac{\sum_{i=1}^{N} Li}{N}} \quad (3)$$

where, N is the number of items of grid elevation data Z1-Z9 used in the calculation, Li is the distance from the node of interest D to the location where each item of the grid elevation data Z1-Z9 was measured.

According to the above expression (3), the grid elevation calculating unit 161 calculates the estimated elevation K1 of the node of interest D, by weighing each item of the grid elevation data Z1-Z9 with the distance from the node of interest D to the location at which the item of the grid elevation data Z1-Z9 was measured. While nine items of grid elevation data Z1-Z9 are used in the example of FIG. 5, two items of grid elevation data for two points that are closest to the node of interest D may be used, or grid elevation data within a given distance from the node of interest D may be used, or ten or more items of grid elevation data may be used. While the amount of calculation increases as the number of items of grid elevation data increases, the estimated elevations K1 of each pair of adjacent nodes of interest D are prevented from abruptly varying from each other if, for example, about nine items of grid elevation data are used. The grid elevation calculating unit 161 calculates the estimated elevation K1 according to the above-indicated expression (3) each time the vehicle passes a node stored in the map DB 17, and stores the estimated elevation K1 associated with the node. As a result, a gradient value $\theta a1$ is calculated from a difference in elevation between the nodes and the length of the corresponding link (the distance between the nodes).

Since the grid elevation calculating unit 161 is able to calculate the gradient value $\theta a1$ for each node without requiring the vehicle to pass the node, the gradient values $\theta a1$ for respective nodes may be stored in advance in the map DB 17.

A2) Gradients Detected by Using Artificial Structures Whose Elevations are Known The grid elevation data stored in the digital map 15 issued by the Geographical Survey Institute are measurement values for depicting a topographic map or natural terrains, and thus do not coincide with elevations of artificial structures. For example, the grid elevation data include elevations of, for example, mountains, valleys and rivers, whereas elevations of links where bridges cross valleys or rivers are higher than those of the grid elevation data, and elevations of links where tunnels are formed by excavating mountains are lower than those of the grid elevation data. Accordingly, the gradient values Gal obtained in the manner as described above at A1) may involve large errors in some places.

Figure 6:
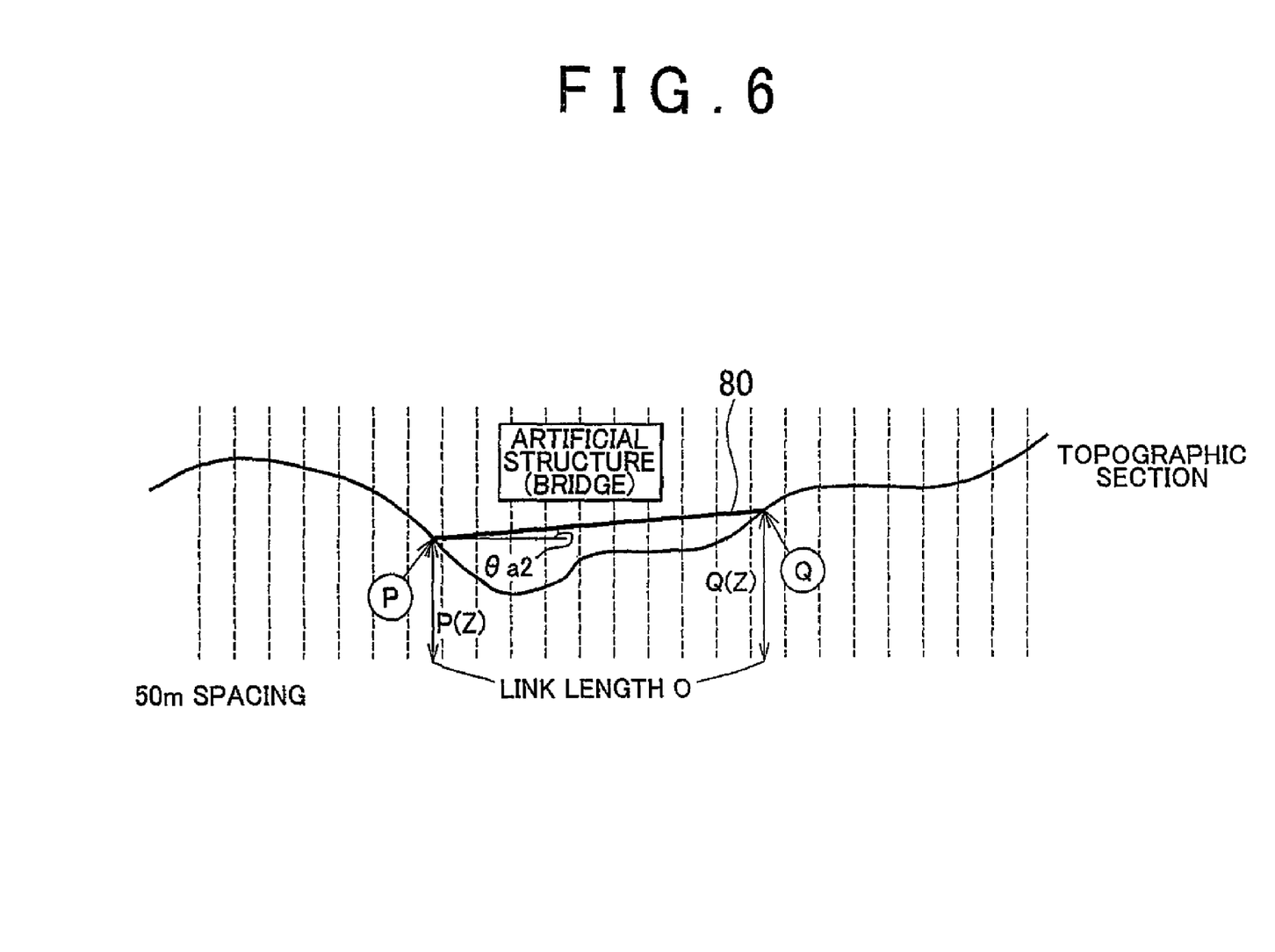
FIG. 6 is a view schematically illustrating the manner of calculating a gradient value θa2 based on an artificial structure, according to the embodiment of the invention.

In this embodiment, therefore, where an artificial structure whose elevation is known is stored in the map DB 17, a gradient value $\theta a2$ calculated based on the elevation of the artificial structure, rather than the gradient value $\theta a1$, is used. FIG. 6 schematically illustrates the manner of calculating a gradient value $\theta a2$ based on an artificial structure. In FIG. 6, a bridge 80 is placed between point P and point Q.

In many cases, the elevation of the artificial structure like the bridge 80 is stored in the map DB 17, and end points (P, Q) of the artificial structure often coincide with nodes. Also, a road attribute, such as a bridge 80 or a tunnel, is registered for each link in the map DB 17, and the length of the link is stored in the map DB 17, so that a gradient value $\theta a2$ can be calculated for the artificial structure whose elevation is stored.

An artificial structure elevation calculating unit 162 of FIG. 1 calculates the gradient value $\theta a2$ from the elevation P (Z) of point P, elevation Q (Z) of point Q, and the link length O, according to the following expression (4).

$$\theta a2 = \arctan\{(Q(Z)-P(Z)/\text{link length } O\} \quad (4)$$

Although the end points (P, Q) of the artificial structure may not coincide with nodes, the gradient value $\theta a2$ is calculated in this case, according to the above expression (4) while using the elevations of nodes that are closest to the end points (P, Q) of the artificial structure.

If the artificial structure elevation calculating unit 162 detects an artificial structure while referring to the map DB 17 based on the current location information 12 during running of the vehicle, it calculates a gradient value $\theta a2$ according to the above-indicated expression (4), and stores the gradient value $\theta a2$ associated with the nodes of the artificial structure. In this connection, it is possible to calculate gradient values $\theta a2$ without causing the vehicle to actually pass the corresponding artificial structures, and the gradient values $\theta a2$ thus calculated may be stored in advance in the map DB 17.

Since the gradient values $\theta a2$ calculated based on the artificial structures are deemed to be more reliable than the gradient values $\theta a1$ calculated from the grid elevation data, the gradient upper-limit determining unit 18 adopts the gradient values $\theta a2$, rather than the gradient values $\theta a1$, as gradient data A, with respect to links for which the gradient values $\theta a2$ have been calculated.

A3) Gradients Determined According to Road Gradient Guidelines Stipulated by Statute In many cases, the upper limit of the road gradients is defined or specified by road gradient guidelines so that extremely steep slopes are not included in roads when constructed. In Japan, for example, "Section 20 of the Orders concerning Road Structure, issued by the Ministry of Land, Infrastructure, Transport and Tourism" sets as follows: "the longitudinal grades or gradients of roadways should be equal to or less than predetermined values in accordance with the design speed of the roadway. In cases of absolute necessity because of topographic circumstances or for other special reasons, the gradient of Type 1, Type 2, or Type 3 road may be equal to or less than a value obtained by adding 3% to the predetermined value, and the gradient of Type 4 road may be equal to or less than a value obtained by adding 2% to the predetermined value."

Figure 7A:
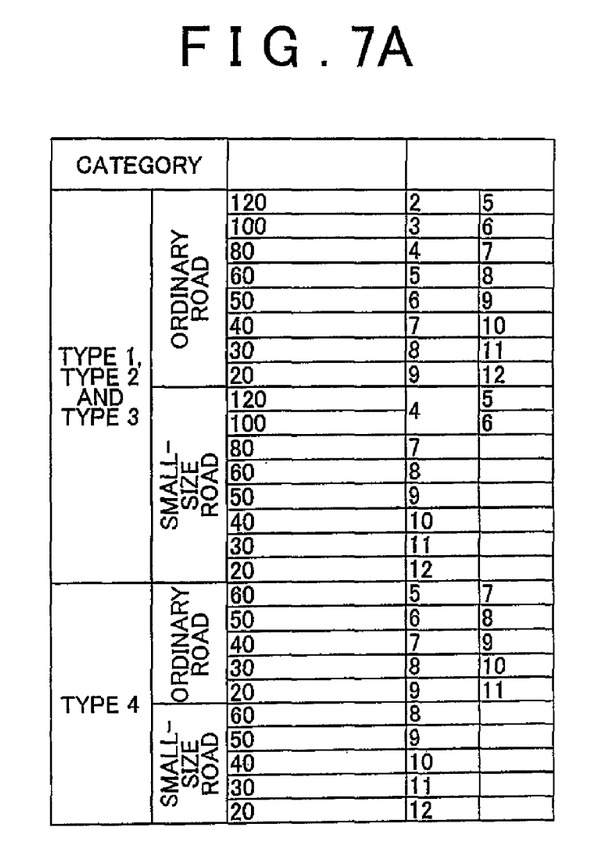
FIG. 7A is a view showing an example of longitudinal grades or gradients stipulated by statute according to road categories, in the embodiment of the invention.
Figure 7B:
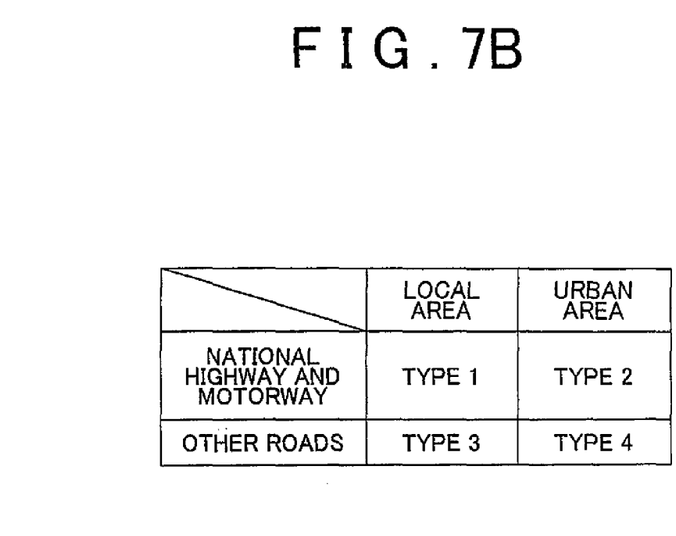
FIG. 7B is a view showing an example of road categories according to the embodiment of the invention.

FIG. 7A shows an example of longitudinal grades or gradients stipulated by statute according to road categories, and FIG. 7B shows an example of road categories. In this example, Type 1 to Type 4 are road categories. In the following description, the upper-limit value of the gradient recommended by statute will be called "gradient value $\theta a3$". The gradient values $\theta a3$ of FIG. 7A are stored in a guideline information 26 as shown in FIG. 1.

The gradients of many roads are determined by statute, and, even if the actual gradients exceed the gradient values $\theta a3$ determined by statute, they are unlikely to exceed the gradient values $\theta a3$ by a large degree. Accordingly, the gradient upper-limit determining unit 18 adopts the gradient value $\theta a3$ as gradient data A if the gradient value $\theta a1$ is larger than the gradient value $\theta a3$, and adopts the gradient value $\theta a1$ as gradient data A if the gradient value $\theta a1$ is equal to or smaller than the gradient value $\theta a3$. Also, for a link for which the gradient value $\theta a2$ is calculated, the gradient value $\theta a2$, which has higher priority than the gradient value $\theta a1$, is adopted; therefore, the gradient upper-limit determining unit 18 adopts the gradient value $\theta a3$ as gradient data A if the gradient value $\theta a2$ is larger than the gradient value $\theta a3$, and adopts the gradient value $\theta a2$ as gradient data A if the gradient value $\theta a2$ is equal to or smaller than the gradient value $\theta a3$.

As described above, the system of this embodiment calculates the gradient value $\theta a1$ or $\theta a2$, for use as fixed gradient data A, and corrects the gradient value $\theta a1$ or $\theta a2$, using the gradient value $\theta a3$ determined by statute. Thus, the system is able to adopt the most appropriate gradient value selected from the gradient values $\theta a1$-$\theta a3$ as fixed values, as gradient data A.

Selection of Gradient Data A or Gradient Data B

A gradient data selecting unit 19 of FIG. 1 extracts more reliable values from the gradient data A and gradient data B determined in the manners as described above, and transmits the extracted data to a vehicle control ECU (electronic control unit) 22. By using gradient data B obtained during actual running of the vehicle, the navigation system 50 of this embodiment is able to perform vehicle control, using the gradient values $\theta b$ obtained at a high density. However, there may be cases where errors in the elevation angle accumulate as the vehicle runs, and the reliability of the gradient values Oh degrades. As a method for correction in such cases, a highly reliable gradient value $\theta b$ may be determined, using gradient values $\theta b$ transmitted from a plurality of vehicles to the server 70 as will be described later. However, the gradient values $\theta b$ stored in the server 70 were calculated in the same manner in the other vehicles, and may involve similar errors and have reduced reliability.

In this embodiment, therefore, while the gradient data B is adopted as a rule, for use in vehicle control, the gradient data A is adopted when the gradient data B is largely different from the gradient data A, so that the gradient data B that is largely different from the gradient data A is prevented from being used for vehicle control.

Thus, the gradient data selecting unit 19 adopts the gradient data B as a rule, but adopts the gradient data A when comparison between the gradient data B and the gradient data A indicates that the gradient data B is larger by, for example, 50% than the gradient data A.

As described above, the navigation system 50 of this embodiment corrects the gradient data B calculated based on the elevation angles sensed during running of the vehicle, using the fixed gradient data A, such as grid elevation data. Thus, the navigation system 50 is able to acquire gradient values θb of links at a high density, and adopt the gradient data A for use in vehicle control if errors occur in the gradient data B during calculation thereof, so that the vehicle control is less likely or unlikely to be affected by the errors.

Gradient Data C

Figure 8:
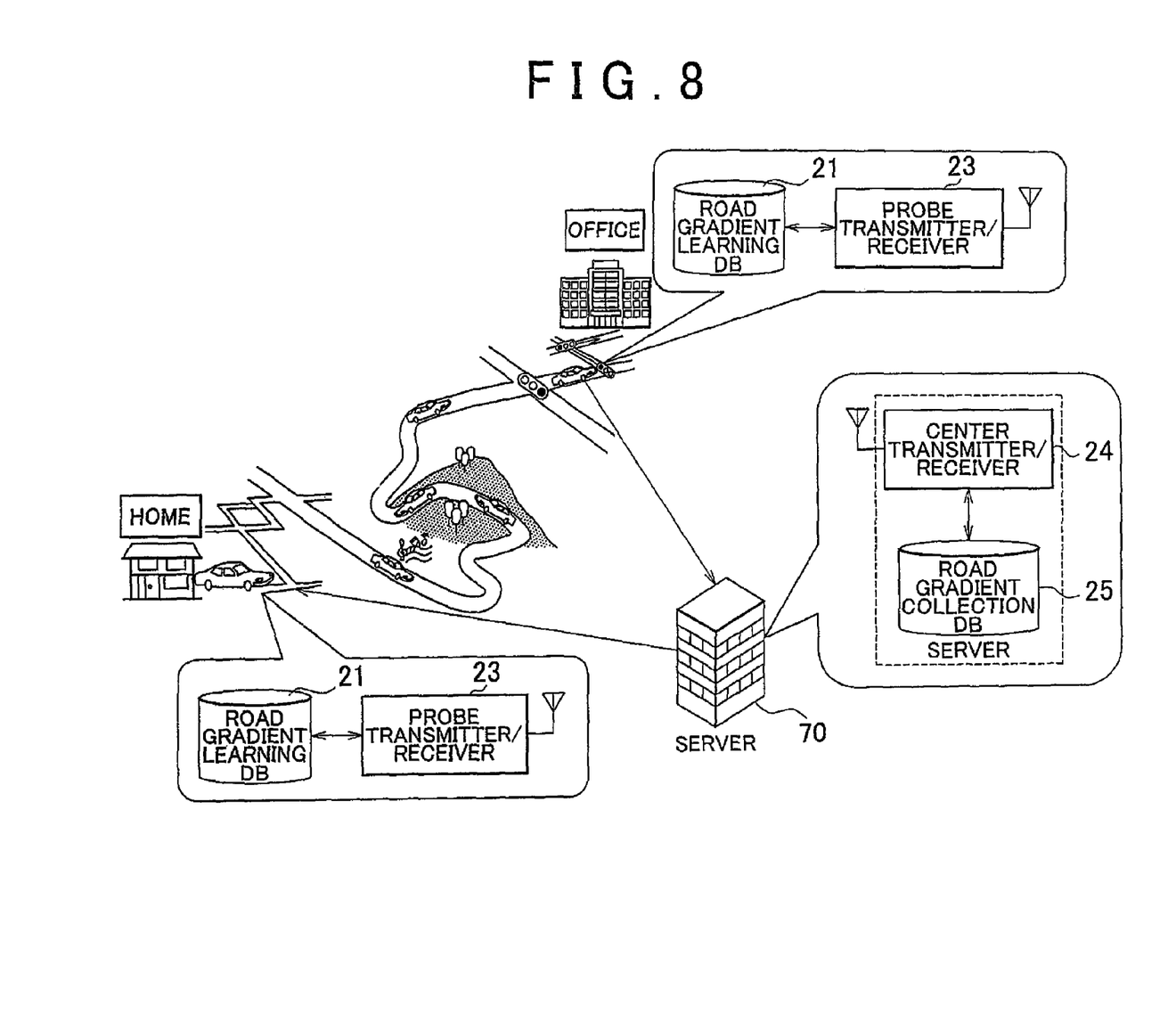
FIG. 8 is a view schematically showing the relationship between a server and vehicles according to the embodiment of the invention.

The navigation system 50 has a probe transmitter/receiver 23, which transmits probe information to the server 70, and receives probe information from the server 70. The probe information includes, for example, location information, vehicle speed information, and gradient values θb. FIG. 8 is an exemplary view schematically showing the relationship between the server 70 and vehicles.

The probe transmitter/receiver 23 establishes connection with a network of, for example, cellular mobile phones or wireless LAN, via a server of, for example, a cellular phone service provider, and transmits probe information to the server 70, based on protocols, such as TCP/IP.

The server 70, which is a computer including CPU and other components, stores a road gradient collection DB 25 in a nonvolatile memory, such as a hard disc drive. A center transmitter/receiver 24, which is, for example, NIC (Network Interface Card), receives probe information while performing protocol processing on data transmitted to the server 70 in the form of packets. Since a communication identification number (e.g., telephone number) of each vehicle is registered in the server 70, the center transmitter/receiver 24 of the server 70 is able to transmit probe information to the registered vehicles.

The probe transmitter/receiver 23 transmits the gradient values θb stored in the road gradient learning DB 21, to the server 70, such that each of the gradient values θb is associated with location information, such as a link number. The transmission of the gradient values θb may be conducted, for example, at regular time intervals (of several minutes or several hours), or when the traffic is not so heavy.

In the manner as described above, gradient values θb of roads all over the country are transmitted to the server 70. The center transmitter/receiver 24 stores the gradient values θb received from vehicles all over the country, in the road gradient collection DB 25. While gradient values θb of the same link are supposed to be transmitted from a plurality of vehicles, the average of the gradient values θb may be simply stored in the road gradient collection DB 25 if the gradient values θb transmitted from the vehicles are comparable or equivalent ones (or have a narrow range of variation).

If, however, the gradient values θb are different from each other to such an extent that they cannot be regarded as being equivalent, the average of these values would not necessarily be an accurate gradient value. Thus, if mutually different gradient values θb are transmitted from different vehicles, it may be considered to adopt one of the gradient values θb that is most appropriate to the energy consumption efficiency. In this case, the server 70 stores a plurality of different gradient values θb transmitted, as they are, and distributes the values θb to a plurality of vehicles. Then, the server 70 receives fuel economy information (the amount of gasoline consumed, electric power used, and electric power regenerated during running on a certain link) from the plurality of vehicles each time the vehicles run on the link for which the gradient values θb were calculated, and determines one of the gradient values θb that provides the greatest improvement in the fuel economy, as the gradient value of the link. In this manner, when different gradient values θb are transmitted, the gradient value θb suitable for the energy consumption advance plan can be adopted.

When the vehicle travels onto a road of which no gradient value θb is stored in the road gradient learning DB 21, the probe transmitter/receiver 23 requests the transmission of the corresponding gradient value θb from the server 70. Thus, the probe transmitter/receiver 23 receives the gradient value θb from the server 70 only when necessary, thus avoiding an otherwise possible increase in network congestions.

Operating Procedure

A procedure by which the navigation system 50 determines gradient data A-C will be described with reference to the flowchart of FIG. 9A and FIG. 9B. The flowchart of FIG. 9A and FIG. 9B does not illustrate procedural steps to follow strictly. For example, gradient data B are calculated all the time during vehicle running, and gradient data A may not be calculated if they are calculated in advance and stored.

The road gradient learning unit 14 calculates a gradient value θb each time a given cycle time elapses, for example, during running of the vehicle (S5). The grid elevation calculating unit 161 calculates a gradient value θa1 while the artificial structure elevation calculating unit 162 calculates a gradient value θa2, and the gradient upper-limit determining unit 18 reads a gradient value θa3 from the guideline information 26 (S10).

Then, the gradient upper-limit determining unit 18 determines whether there is an artificial structure on the path of the vehicle (S20). If there is an artificial structure (i.e., if an affirmative decision (YES) is made in step S20), the gradient value θa2 is more reliable than the gradient value θa1, as described above, and thus the gradient upper-limit determining unit 18 determines whether the gradient value θa2 is larger than the gradient value θa3 (S30). Likewise, if there is no artificial structure (i.e., if a negative decision (NO) is made in step S20), the gradient upper-limit determining unit 18 determines whether the gradient value θa1 is larger than the gradient value θa3 (S40).

If the gradient value θa2 is not larger than the gradient value θa3 (i.e., if a negative decision (NO) is made in step S30), the gradient value θa2 is determined as gradient data A (S50) since it is presumed that the gradient value θa2 can be adopted. If the gradient value θa2 is larger than the gradient value θa3 (i.e., if an affirmative decision (YES) is made in step S30), the gradient value θa3 is determined as gradient data A (S60).

If the gradient value θa1 is not larger than the gradient value θa3 (i.e., if a negative decision (NO) is made in step S40), the gradient value θa1 is determined as gradient data A (S80) since it is presumed that the gradient value θa1 can be adopted. If the gradient value θa1 is larger than the gradient value θa3 (i.e., if an affirmative decision (YES) is made in step S40), the gradient value θa3 is determined as gradient data A (S70).

Then, the gradient data selecting unit 19 determines whether gradient data B for the path on which the vehicle is running is stored (S90). If no gradient data B is stored (i.e., if a negative decision (NO) is made in step S90), the gradient data selecting unit 19 requests the transmission of gradient data C from the server 70 (S100).

The gradient data selecting unit 19 determines whether the gradient data C is stored in the server 70 and the system was able to receive the gradient data C without suffering communication errors (S110). If the gradient data C was successfully received (i.e., if an affirmative decision (YES) is made in step S110), the gradient data selecting unit 19 compares the gradient data C, rather than gradient data B, with the gradient data A (S120).

If the system was not able to receive the gradient data C (i.e., if a negative decision (NO) is made in step S110), the gradient data selecting unit 19 adopts gradient data A, and sends the data to the vehicle control ECU 22 (S130).

The gradient data selecting unit 19 determines whether the gradient data B or gradient data C is larger by a predetermined value or more than the gradient data A (S120). If the gradient data B or C is larger by the predetermined value or more than the gradient data A (i.e., if an affirmative decision (YES) is made in step S120), the reliability of the gradient data B or C is deemed to be low, and the gradient data selecting unit 19 adopts the gradient data A (S130).

If the gradient data B or C is not larger by the predetermined value or more than the gradient data A (i.e., if a negative decision (NO) is made in step S120), the reliability of the gradient data B is deemed to be sufficiently high, and the gradient data selecting unit 19 adopts the gradient data B (S140).

In the manner as described above, the navigation system 50 of this embodiment is able to adopt the actually measured, high-density gradient data B when appropriate, and generate the data to the vehicle control ECU 22.

Figure 9A:
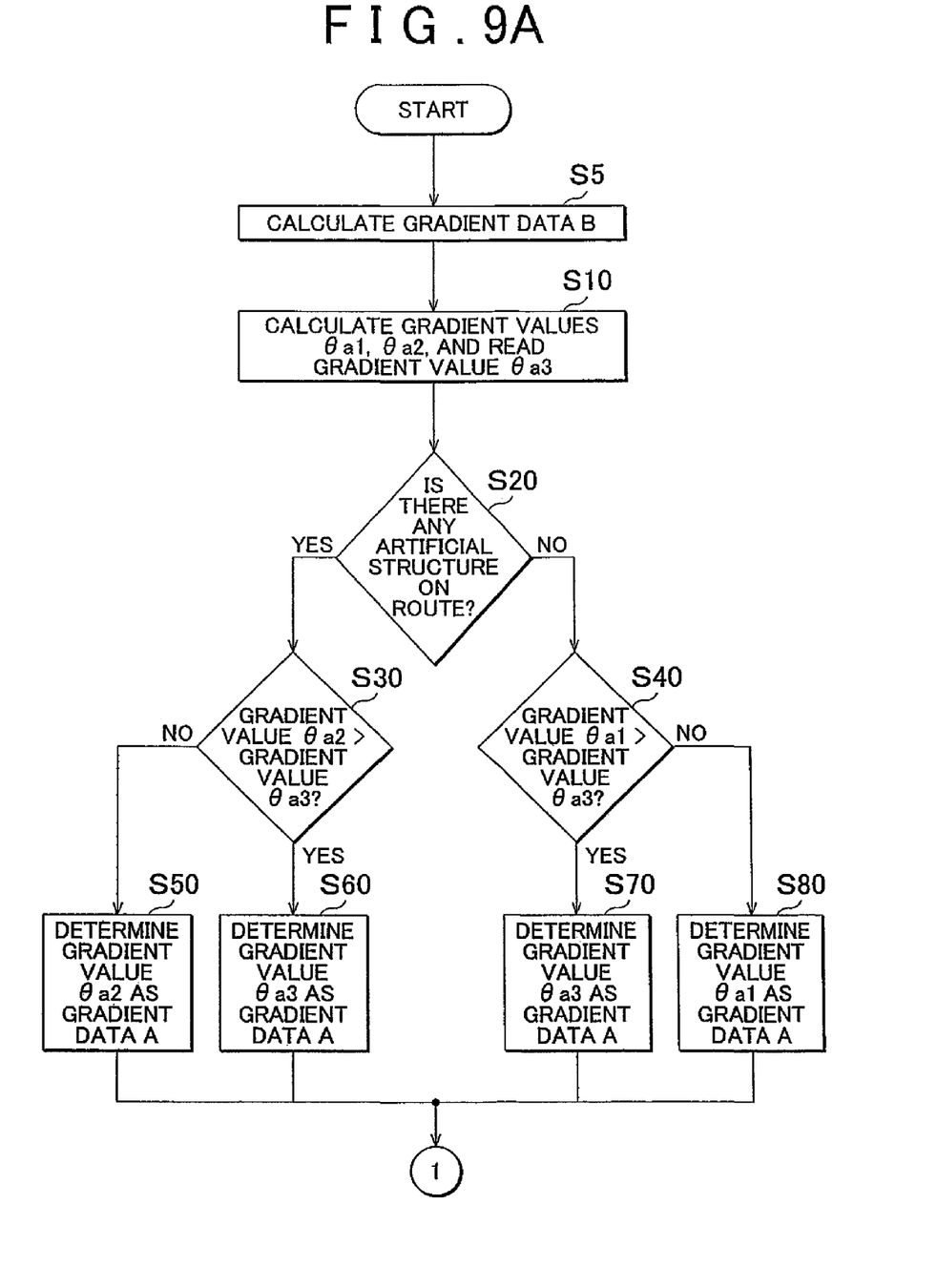
FIG. 9A is a flowchart illustrating a procedure by which a navigation system of the embodiment of the invention determines gradient data A-C.
Figure 9B:
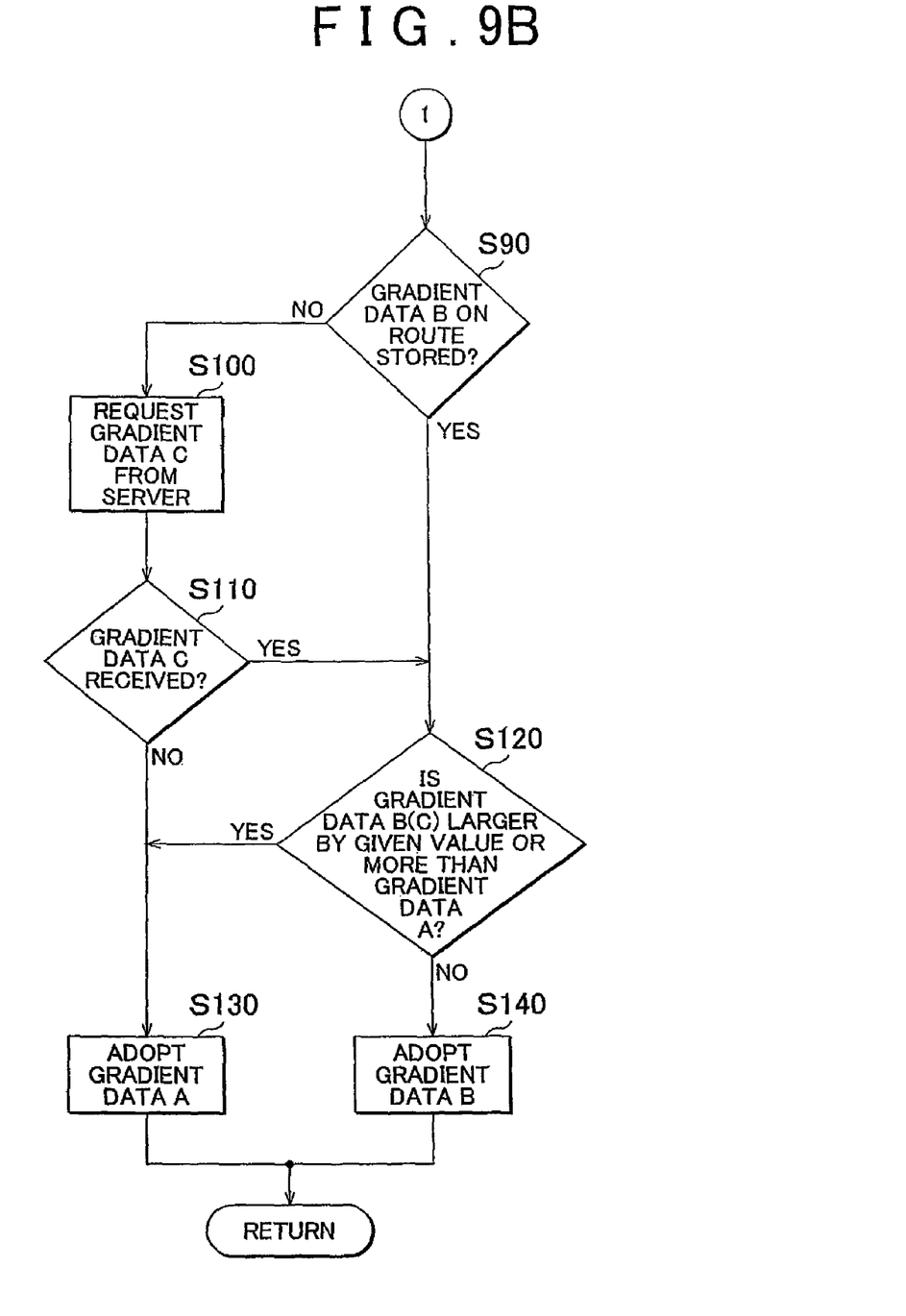
FIG. 9B is a flowchart illustrating a procedure by which a navigation system of the embodiment of the invention determines gradient data A-C.

In FIG. 9A and FIG. 9B, a value selected from the gradient values θa1-θa3 is set as gradient data A, and the gradient data A is compared with the gradient data B. However, a gradient value to be adopted may be determined without making a selection from the gradient values θa1-θa3, but making any one of direct comparisons between the gradient value θa1 and the gradient data B, the gradient value θa2 and the gradient data B, or between the gradient value θa3 and the gradient data B.

Vehicle Control Based on Energy Consumption Advance Plan

In a hybrid vehicle or electric vehicle, the battery is charged with energy collected through regenerative braking when the vehicle runs on a downward slope. If the gradient data A-C are available, the fuel efficiency or fuel economy may be improved. For example, in the case where an upward slope and then a downward slope are expected to appear on the road ahead of the vehicle, if the driving force of an electric motor is controlled to be large when the vehicle runs on the upward slope, and the battery is charged when the vehicle runs on the downward slope, the amount of gasoline consumed on the upward slope can be reduced, and the fuel economy is improved. Where successive upward slopes are expected, the proportion of motor running may be reduced so as to prevent the battery from discharging excessively.

Where a downward slope is expected, upshifting of the transmission is inhibited in advance, and the braking force generated from engine brakes is increased, so as to increase the amount of electric power collected through regenerative braking.

Also, the fuel economy may be improved by utilizing ACC (Adaptive Cruise Control) under which a vehicle (which will be called "own vehicle") runs following a preceding vehicle or runs at a constant speed. During running under the ACC, the vehicle runs at a constant speed if no preceding vehicle is detected, but the vehicle speed is reduced if an upward slope is detected ahead of the vehicle, and is then increased so as to resume the original constant speed. Where the vehicle is running while following a preceding vehicle, the own vehicle is decelerated when the preceding vehicle reaches an upward slope and the distance between the vehicles is reduced, and the own vehicle is accelerated when the preceding vehicle reaches a downward slope and the distance between the vehicles is increased. With the ACC, therefore, the fuel economy may deteriorate owing to the control of the vehicle speed of the own vehicle and the control of the distance between the vehicles. In this respect, if gradient data A-C are stored in advance, and there is an upward slope ahead of the vehicle that is running at a constant speed, the vehicle speed is increased before the vehicle reaches the upward slope, according to the gradient data A-C, so that the vehicle speed is made approximately equal to the original constant speed when the vehicle starts running on the upward slope, thus eliminating a need to accelerate the vehicle during running on the upward slope, which leads to a large reduction of the fuel consumption. Where an upward slope and a downward slope are expected to appear successively during running of the vehicle following a preceding vehicle, the deceleration or acceleration required for keeping the distance between the vehicles constant can be reduced, for example, the acceleration can be reduced before the vehicle reaches the downward slope, resulting in a reduction of the fuel consumption.

Also, a PCS (Pre-Crash Safety System) is operable to generate an alarm when there is a possibility of a collision, according to TTC (Time To Collision) against an obstacle, and decelerate the vehicle when the possibility of the collision increases, to thus assist the driver in driving the vehicle. In this case, the TTC is presumed to vary depending on the braking distance. For example, when a preceding vehicle starts running on an upward slope after running on a downward slope, the preceding vehicle is decelerated, and therefore the TTC is expected to be reduced. Accordingly, if gradient data A-C are available to the PCS, the system is able to perform more appropriate control. More specifically, an alarm may be generated or brakes may be applied at an earlier time when an upward slope is expected to appear, and generation of an alarm may be delayed so as to reduce unnecessary warnings when a downward slope is expected to appear.

Also, an active suspension system is known in which characteristics of suspensions are controlled to be varied according to the vehicle speed, steering, load, and so forth. Where it is predicted from gradient data A-C that an upward slope is ahead of the vehicle, a front suspension for front wheels is made supple or soft, thus making it easy to prevent the vehicle from being inclined backward. Where it is predicted from gradient data A-C that a downward slope is ahead of the vehicle, the front suspension is made stiff, thus making it easy to prevent the vehicle from being inclined forward. Thus, the balance of the front and rear suspensions is controlled, using the gradient data A-C, to vary depending on whether an upward slope or a downward slope is ahead of the vehicle, so as to improve the comfort of occupants of the vehicle.

As is understood from the above description, the vehicle control ECU 22 of FIG. 1 includes, for example, hybrid ECU for controlling the driving source of the hybrid vehicle, transmission ECU for controlling the shift position of the transmission, brake ECU for controlling the wheel cylinder pressures of the respective wheels independently, suspension ECU for controlling the active suspension, and the like, and these ECUs receive gradient data A-C via CAN (Controller Area Network), or the like, so as to implement the control operations as described above.

As explained above, the navigation system 50 of this embodiment is able to calculate a gradient value (gradient data B) for each link, which is difficult to obtain, during actual running of the vehicle, to provide high-density gradient data B, and correct the gradient data B with fixed gradient data A, such as grid elevation data, even where errors occur in the gradient data B during calculation thereof, thus assuring high accuracy of the gradient values. Also, the vehicle running control system 60 is able to predict downward slopes and upward slopes from the gradient data A-C, so as to make an energy consumption advance plan for improvement of the fuel economy, and is also able to perform driving assist and vehicle posture control at appropriate times.

While the invention has been described with reference to example embodiments thereof, it is to be understood that the invention is not limited to the described embodiments or constructions. For example, the grid elevation data may be any type of elevation data provided that the elevations have been measured. To the contrary, the invention is intended to cover various modifications and equivalent arrangements. In addition, while the various elements of the example embodiments are shown in various combinations and configurations, other combinations and configurations, including mode, less, or only a single element, are also within the spirit and scope of the invention.

The invention claimed is:

1. A gradient information calculating system, comprising:
    a first calculating unit that detects three-dimensional location information through autonomous navigation, and calculates a first gradient value of a given point on a road, based on a distance traveled in a given period of time, and an on-plane distance obtained by projecting the distance traveled on a horizontal plane;
    a road map information storing unit that stores road map information that represents each road by a first node and a second node of which the location information is known, and a link that connects the first node with the second node;
    a second calculating unit that estimates an elevation of each of the nodes from previously measured elevation data, and calculates a second gradient value for the link, based on a difference in elevation between the first node and the second node, and the length of the link; and
    a gradient data selecting unit that compares the first gradient value with the second gradient value, and selects one of the first and second gradient values to be adopted as a gradient value of the given point or link, according to a difference between the first gradient value and the second gradient value.

2. The gradient information calculating system according to claim 1, wherein the gradient data selecting unit selects the second gradient value when the difference between the first gradient value and the second gradient value is large.

3. The gradient information calculating system according to claim 2, wherein the gradient data selecting unit selects the second gradient value when the first gradient value is larger by a predetermined value or more than the second gradient value.

4. The gradient information calculating system according to claim 3, wherein the predetermined value is 50% of the second gradient value.

5. The gradient information calculating system according to claim 1, wherein the second calculating unit selects the elevation data within a given distance from the node in question, from the elevation data measured for each of meshes defined by latitudes and longitudes arranged with a specified grid spacing, and weights the elevation data within the given distance, according to a distance between a measurement position of the elevation data and the node, so as to estimate the average of the weighted elevation data as an elevation of the node.

6. The gradient information calculating system according to claim 1, wherein the second calculating unit selects the elevation data of a mesh to which the node in question belongs, and the elevation data of eight meshes surrounding said mesh, from the elevation data measured for each of meshes defined by latitudes and longitudes arranged with a specified grid spacing, and weights the elevation data of the mesh and the surrounding eight meshes, according to a distance between a measurement position of the elevation data and the node, so as to estimate the average of the weighted elevation data as an elevation of the node.

7. The gradient information calculating system according to claim 1, wherein
    when the road map information includes a link comprising an artificial structure whose elevation data is registered, the second calculating unit adopts a gradient value calculated from elevation data of end points of the artificial structure and the length of the link, as the second gradient value.

8. The gradient information calculating system according to claim 1, further comprising:
    a guideline information storing unit that stores guideline information that specifies a gradient upper limit of gradients for each road category; and
    a gradient upper-limit determining unit that reads the gradient upper limit based on the road category, and adopts the gradient upper limit as a gradient value for the given point or link, when the second gradient value obtained by calculation is larger than the gradient upper limit.

9. The gradient information calculating system according to claim 1, further comprising:
    a guideline information storing unit that stores guideline information that specifies a gradient upper limit of gradients for each road category; and
    a gradient upper-limit determining unit that reads the gradient upper limit based on the road category, and adopts the gradient upper limit as the second gradient value when the second gradient value obtained by calculation is larger than the gradient upper limit.

10. The gradient information calculating system according to claim 1, further comprising:
    a transmitter that transmits the first gradient value calculated by the first calculating unit, to a server; and
    a receiver that receives the first gradient value calculated by another vehicle, from the server.

11. A vehicle running control system, comprising:
    the gradient information calculating system according to claim 1; and
    a vehicle controller that performs vehicle control, using the gradient value selected by the gradient data selecting unit.

12. A navigation system, comprising:
    the gradient information calculating system according to claim 1;
    a GPS receiver; and
    a display unit that displays a road map including a location detected through autonomous navigation.

13. A gradient information calculating method, comprising:
    detecting three-dimensional location information through autonomous navigation;
    calculating a first gradient value of a given point on a road, based on a distance traveled in a given period of time, and an on-plane distance obtained by projecting the distance traveled on a horizontal plane;
    estimating elevations of a first node and a second node on the road, from previously measured elevation data;

calculating a second gradient value for a link that connects the first node with the second node, based on a difference in elevation between the first node and the second node, and the length of the link;

comparing the first gradient value with the second gradient value and calculating a difference between the first gradient value and the second gradient value; and selecting, using a processor, one of the first and second gradient values to be adopted as a gradient value of the given point or link, according to the calculated difference.

14. The gradient information calculating method according to claim 13, wherein when the link comprises an artificial structure whose elevation data is registered, a gradient value calculated from elevation data of end points of the artificial structure and the length of the link is adopted as the second gradient value.

15. The gradient information calculating method according to claim 13, further comprising:

storing guideline information that specifies a gradient upper limit of gradients for each road category; and reading the gradient upper limit based on the road category, and adopting the gradient upper limit as a gradient value for the given point or link when the second gradient value obtained by calculation is larger than the gradient upper limit.

16. The gradient information calculating method according to claim 13, further comprising:

transmitting the calculated first gradient value to a server; and receiving the first gradient value calculated by another vehicle, from the server.

* * * * *